J. A. WENTWORTH.
Lubricating Journals.
No.149,621. Patented April 14, 1874.
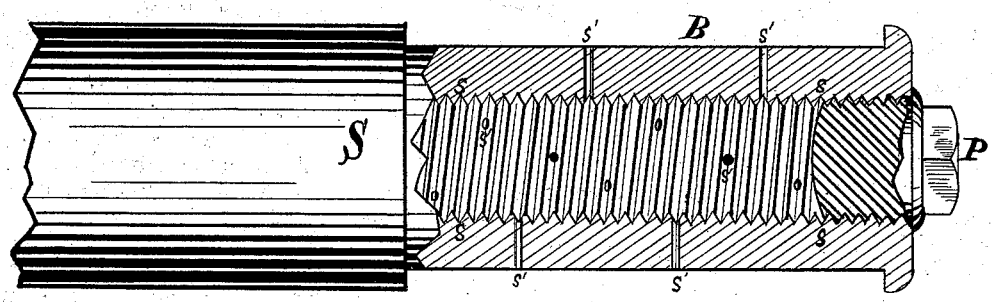
Attest
C. A. Riter
J. B. Corbin
Inventor
James A. Wentworth
  for
T. Van Kannel & Co
    attys.

UNITED STATES PATENT OFFICE.

JAMES A. WENTWORTH, OF TOLEDO, OHIO, ASSIGNOR OF ONE-HALF HIS RIGHT TO HENRY T. STEBBINS, OF MONROE, MICHIGAN.

IMPROVEMENT IN LUBRICATING-JOURNALS.

Specification forming part of Letters Patent No. 149,621, dated April 14, 1874; application filed September 17, 1873.

*To all whom it may concern:*

Be it known that I, JAMES A. WENTWORTH, of Toledo, county of Lucas and State of Ohio, have invented a new and useful Improvement in Lubricators; and I do hereby declare that the following is a full, clear, and exact description of the same, reference being had to the annexed drawing, making a part of this specification.

The drawing shows a section of the end of a shaft or axle.

My invention relates to that class of lubricators wherein the lubricating material is contained within the axle or shaft; and it consists in making a spiral groove or screw thread on the inner surface of the lubricator, whereby the lubricating material will be uniformly distributed.

That my improvement may be fully understood, I will particularly describe it.

S represents one end of the shaft or axle, and B the journal. The end of the shaft is bored longitudinally the length of the journal-bearing, as seen at $s$.

A right or left handed screw-thread is cut in the bore its entire length, a small portion of the same at the extreme end being occupied by the plug P, which has been cut with either a right or left handed thread to fit that of the bore. At various points within said bore are a series of small ducts, $s'$ $s'$ $s'$, drilled from the outside of the journal so as to communicate with the interior. These holes are bored in rows spirally around the journal, in order to distribute the weakening caused by the drilling.

The operation of my invention is as follows: A suitable lubricating material—such as tallow—having been placed within the bore the plug P is replaced, as seen in the drawing. When the journal has obtained some speed the heat caused by friction melts the tallow, which flows through the holes $s$ $s$ to the interior of the journal. The screw-thread in the bore, as the shaft revolves, distributes the material contained uniformly throughout the length of the bore.

I am aware that an axle has been made hollow for the reception of a lubricating substance, which has been permitted to escape through lateral perforations, and, therefore, do not claim that device, except in connection with the internal spiral groove.

Having thus described my invention, what I claim as new, and desire to secure by Letters Patent, is—

The journal B, having the spirally-grooved bore $s$, and ducts $s'$ $s'$, in combination with the screw-plug P, substantially as and for the purpose set forth.

JAMES A. WENTWORTH.

Attest:
J. M. GLOYD,
FRANK VALTER.